United States Patent Office 3,354,042
Patented Nov. 21, 1967

3,354,042
STEAM SUPERHEATING NUCLEAR REACTOR
HAVING STEAM FLOW EQUALIZER
Thomas B. Murdock, San Jose, Calif., assignor to the United States of America as represented by the United States Atomic Energy Commission
Filed Mar. 24, 1967, Ser. No. 626,369
5 Claims. (Cl. 176—59)

ABSTRACT OF THE DISCLOSURE

An apparatus for equalizing the flow of steam through a group of steam superheating fuel element assemblies commonly manifolded at their inlets and outlets and incorporating a region in which condensate may be trapped to cause unequalized flow of steam. The condensate trap regions are arranged at a common level and are intercommunicated by manifolding with a conduit or conduit and valve arrangement to equalize the level of condensate among the fuel element assemblies.

Background of the invention

The invention described herein was made in the course of, or under, Contract No. AT(04–3)–189, Project Agreement No. 29 with the United States Atomic Energy Commission.

This invention is for use in nuclear reactors and systems, and especially in associated plural reactor components conducting circulating fluid within the reactor. In particular, this invention relates to steam superheating nuclear reactors, and more specifically to apparatus for preventing nonuniform heating and overheating of the fuel elements by equalizing the flow of steam through the fuel elements.

In steam superheating reactors, it is desirable to have the steam in contact with the fissile fuel-filled rods in the fuel element assembly for a prolonged time as possible to more efficiently heat the steam to as high a superheated temperature as possible. To do this and still achieve a geometry for a nuclear reactor core which is efficient for utilization of neutrons, i.e., a shape approaching the geometry of a sphere, such as a cylinder whose height is almost equal to its diameter, and yet not be so large as to be prohibitively expensive to construct and difficult to control, the direction of the flow of steam is usually reversed one or more times as it passes through the core. For vertically arrayed fuel elements, the portion of the fuel element assembly whereat the direction of steam flow is reversed is usually the lowest point of the assembly and for this reason tends to be the region where condensate collects and either completely blocks the flow of steam or seriously impedes its flow. In essence, the region acts in the manner of a trap to collect condensate during shutdown of the reactor or a similar condition in which steam condenses.

For a single fuel element assembly, of the type providing a condensate trapping region if sufficient steam pressure is available at the inlet to the fuel element, the condensate trapped in fuel element may be blown out or heated by the steam to evaporate and thus remove the impediment to the normal flow of steam without untoward consequences. However, when several such fuel element assemblies are manifolded at their steam inlets and outlets respectively in order to reduce the cost and complication of the nuclear reactor construction and installation, the inlet steam pressure is equalized along all the fuel elements of the manifolded group. If passage of steam through one fuel element assembly happens to be blocked by condensate, the flow of steam is distributed among the other fuel elements of the manifolded group so that the inlet steam pressure does not rise sufficiently to blow out and evaporate the condensate in the blocked fuel element. In such an event, with no steam passing through the fuel element to cool the fissile fuel-filled rods, a burnout or excessive temperature condition will result. Such a condition may prove severe enough to rupture the fuel rods and release dangerous radioactive material into the system.

The present invention prevents this condition from arising by providing structure for distributing the condensate of the blocked fuel element among the other fuel elements of the manifolded group so that the resistance to the flow of steam is equalized for all fuel elements of the group.

Summary of the invention

In brief, the apparatus of this invention establishes, at a common level, the bypass portions of the regions in all the fuel elements of the manifolded group whereat condensate is trapped, and intercommunicates these regions by means of a conduit so that condensate is distributed to a common surface level among all fuel elements of the group providing equalized resistance to steam flow with concomitant assured equalized steam flow in each element. In one embodiment, a valve means is included in the conduit to permit automatic connection of the region containing condensate to the conduit when the fuel element is inserted in the reactor core.

It is, therefore, an object of this invention to provide an apparatus for eliminating the deleterious effects caused by water trapped in steam superheating nuclear reactors.

It is a further object of this invention to provide an apparatus for equalizing the flow of steam through nuclear reactor fuel elements connected to a common steam inlet and common steam outlet.

It is another object of this invention to provide an apparatus for preventing overheating of fissile fuel-filled rods in a group of fuel element assemblies for a steam superheating nuclear reactor which are connected to a common inlet and common outlet, and in which condensate deposits to block the flow of steam in individual fuel element assemblies.

It is still another object of this invention to provide an apparatus for permitting groups of fuel elements to be automatically connected to a manifold at the region whereat condensate collects and blocks or impedes the flow of steam through an individual fuel element assembly.

Other and more particular objects of this invention will be manifest upon study of the following description, when taken together with the accompanying drawing.

Description of the preferred embodiment

Figure 1:
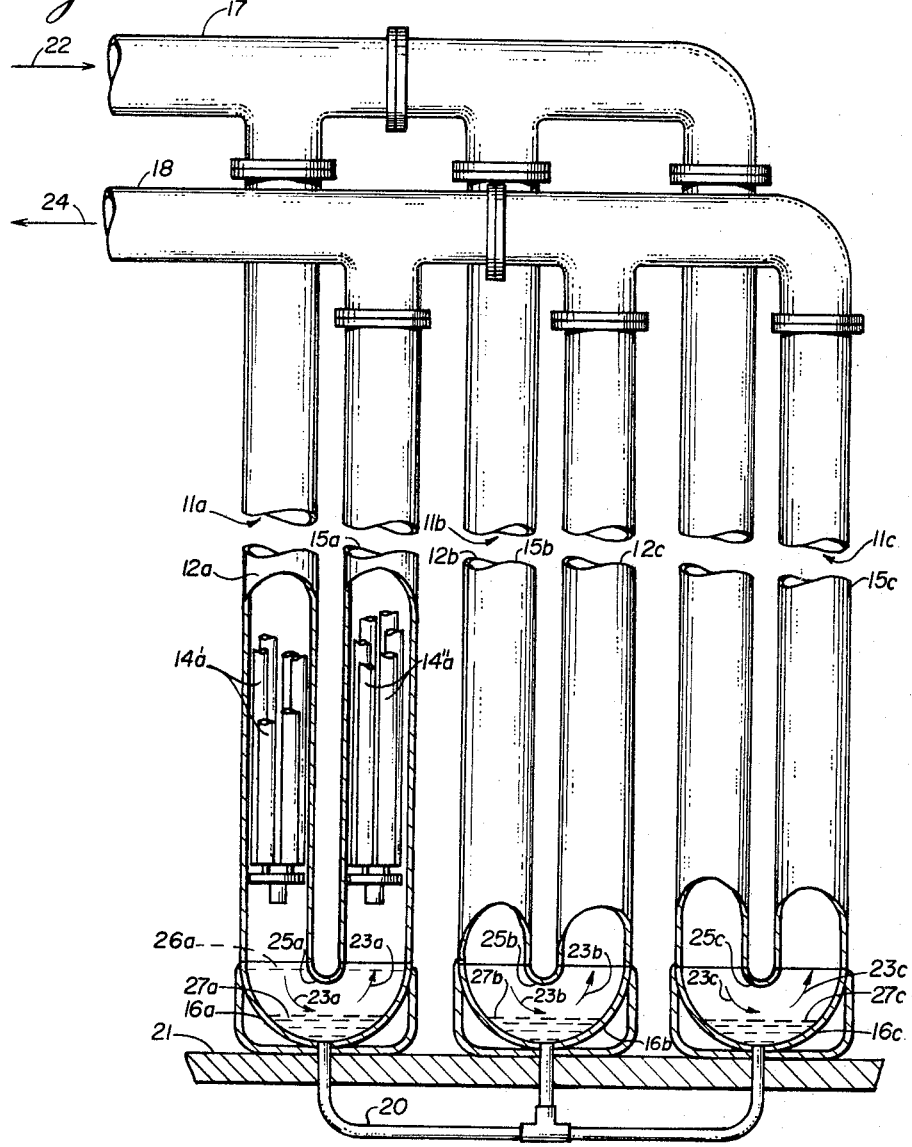
FIGURE 1 is a partial longitudinal section of a group of fuel elements connected to a common steam inlet and a common steam outlet in a steam superheating nuclear reactor, showing the portion of the fuel element assembly in which the condensate is collected and trapped and the apparatus for equalizing the level of condensate between fuel element assemblies.

In detail, with reference to FIGURE 1, three typical steam super-heating nuclear reactor fuel element assemblies are illustrated in partial section. The fuel element assemblies are identical and will be identified in this description as fuel elements 11a, 11b and 11c corresponding to their position beginning from the left as beginning with 11a, then 11b, and finally 11c at the right. Since the parts of each fuel element are similar, a similar reference numeral will be used to identify corresponding parts of the fuel element assembly followed by a lower case *a*, *b*, or *c* corresponding respectively to the fuel element assembly 11*a*, 11*b* or 11*c* where particular reference is required.

Each fuel element 11*a*, 11*b* and 11*c* comprises a vertically oriented inlet process tube 12 containing a bundle of fissile fuel-filled rods 14′, a vertically oriented spaced and generally parallel outlet process tube 15 also containing a bundle of fissile fuel-filled rods 14″ and a U shaped conduit or tube section 16 communicating the bottom end of inlet process tube 12 with the bottom end of outlet process tube 15. The upper end of inlet process tube 12 of each fuel element assembly 11 is connected to communicate with common inlet or manifold 17, while the upper end of outlet process tube 15 of each fuel element assembly 11 is connected to communicate with common outlet or manifold 18, in a configuration typical of those in conventional practice. However, in accordance with the invention, a conduit means or manifold 20 is connected to communicate the bottom of U tube or conduit 16*a* with conduit 16*b* with 16*c* of fuel elements 11*a*, 11*b* and 11*c* respectively. The U tube section 16 of each fuel element assembly 11 is arranged at a common level by fastening to a resting on support bar or plate 21. With this configuration, the fluid in any of the conduit sections 16 will flow to any other section 16 and reach a common level.

It will be noted that fuel element assemblies 11*a*, 11*b* and 11*c* are spaced apart in FIGURE 1 for clarity in describing the invention. In practice, the assemblies are more compactly arranged generally in groups of 4, 6, 8 or more fuel element assemblies, all assemblies of the group connected to a common inlet and outlet with all U tube sections 16 of the group manifolded together. While specific reference has been made to a U-tube type conduit connection, it will be appreciated that a similar trapping effect will be produced in concentric and other fuel element configurations or even in manifolds or the like which may be employed in other nuclear reactor core configurations.

In operation, steam enters inlet manifold 17, as indicated by arrow 22 from a steam supply source such as a conventionally fired boiler or nuclear boiling water reactor (not shown). The entering steam passes down inlet process tube 12 of each element where it is superheated by fissile fuel-filled rods 14′. The steam then passes into U tube or conduit section 16 where the direction of flow is reversed as indicated by arrows 23. The steam then passes up outlet tube 15 where it is further superheated by fissile fuel-filled rods 14″. The superheated steam then passes into outlet manifold 18 and then out of the reactor as indicated by arrow 24 to an energy conversion means such as a heat exchanger, turbine or the like (not shown).

It can be seen that, in this configuration, when the reactor is shut down or cooled sufficiently for steam to condense, or condensate is produced in any other manner or water enters with the steam, the condensate will tend to collect in the U tube section 16. This section or region thus acts in the manner of a trap or, in effect, a partitioned chamber having as its downward projection partition, the inside curved wall portion 25 of U tube section 16. In arranging the U-tube sections 16 at a common level, it is critical that the partition wall portions 25 be in a common horizontal plane.

For example, if sufficient condensate deposits in tube section 16*a* to reach a level even with or above projection 25*a*, such as indicated by dotted line 26*a*, it will block the flow of steam through the fuel element assembly 11*a*. It can also be seen that in the absence of conduit 20 intercommunicating each of the U tube sections 16*a*, 16*b* and 16*c*, the level of condensate in each U tube will be determined by the amount of condensate deposited in each, unaffected by condensation deposited in any of the other fuel elements. Thus, some fuel element assemblies may be completely blocked such as assembly 11*a*, and others only partially blocked. In this situation, the steam that would enter fuel element assembly 11*a* to be heated by and cool fuel rods 14′*a* and 14″*a* is diverted to fuel elements 11*b* and 11*c*. If the level of condensate in U tube section 16*b* and 16*c* were different, but did not block the tubes, the difference in throttling caused by the spacing between the surface of the condensate and partition wall portions 25*b*, 25*c*, respectively, would cause different rates of steam flow in each element. The rate of heat transfer from the fuel rods 14*b* and 14*c* would be different and thus these temperatures would differ to reduce the efficiency of the reactor.

By the use of conduit 20 to manifold each U tube portion, i.e., condensate trap, 16*a*, 16*b* and 16*c* to each other and thus intercommunicate the various fuel-element U-tubes, the level of condensate will equalize and reach a common level 27. With U tube sections 16*a*, 16*b* and 16*c* arranged with the partition wall portion in a common horizontal plane by support bar or plate 21, the throttling effect, i.e., restriction in cross sectional area by the condensate in each U tube will be the same so that the rate of flow of steam through each fuel element will be the same.

It can also be seen that, should sufficient condensate collect in the U tube section, i.e., condensate traps 16*a*, 16*b* and 16*c* to reach a level above partition 25*a*, 25*b* and 25*c*, respectively, the inlet pressure will rise equally for all fuel elements to permit condensate in all the fuel elements to be blown out and evaporated simultaneously.

Figure 2:
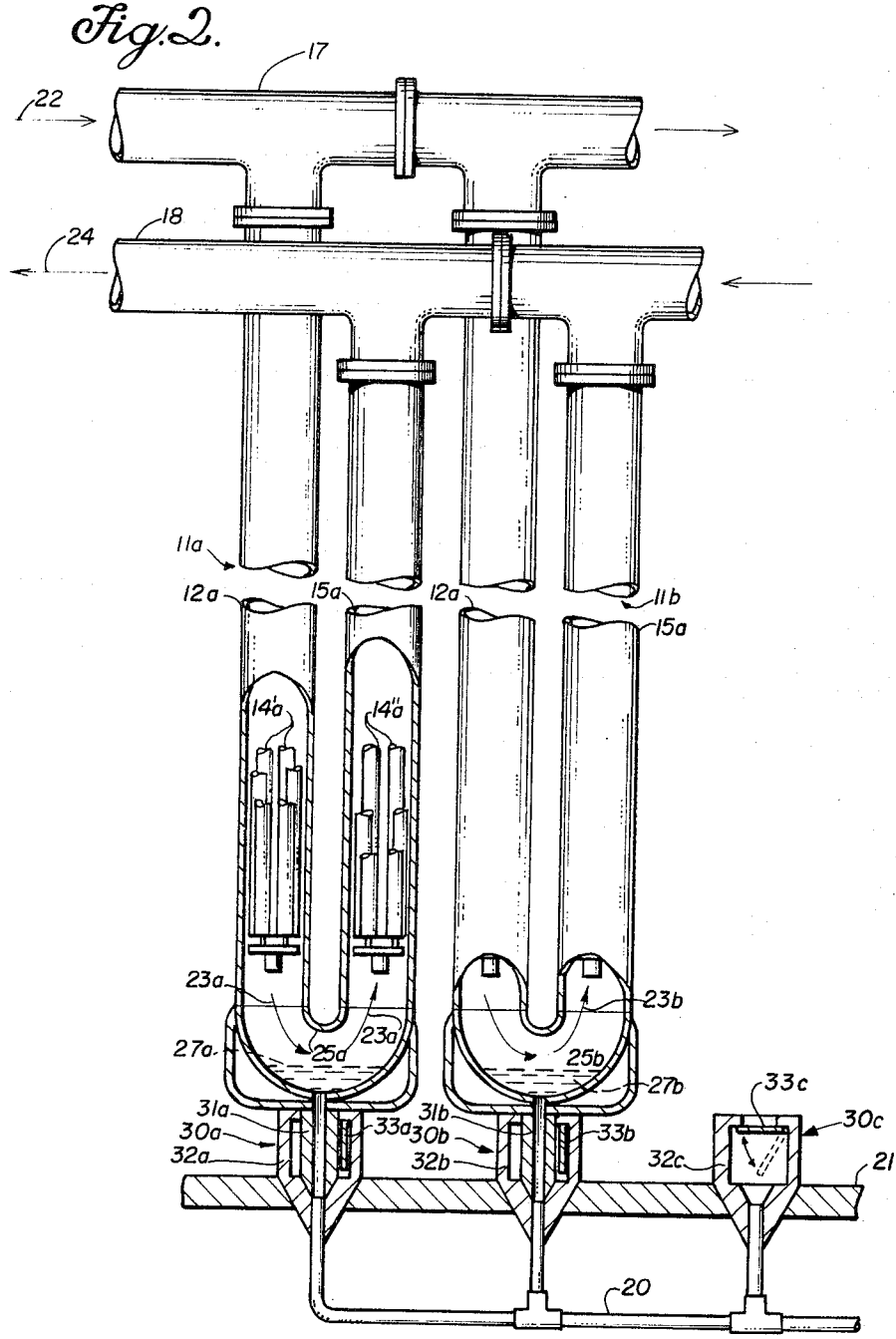
FIGURE 2 is a partial longitudinal section of fuel element assemblies similar to those in FIGURE 1, however, showing means by which the fuel elements are automatically connected to the manifold for equalizing the level of condensate between fuel element assemblies.

With respect to FIGURE 2, the embodiment illustrated here is essentially identical to the fuel element assembly of FIGURE 1, with the exception that a valve means 30 is provided between conduit 20 and U tube or condensate trap section 16.

Valve means 30 comprises basically a nozzle 31 affixed to U tube section 16, a connector receptacle body 32 secured to plate 21 and provided with an upward facing orifice 35 to receive nozzle 31 and a spring loaded flap valve 33 arranged within receptacle body to close orifice 35, as shown for example, in valve 30*c*, when a fuel element assembly is not present.

In operation, a fuel element assembly is inserted so that nozzle 31 is guided through orifice 35 in valve receptacle 32. In so doing, flap valve 33 is caused to swing inside receptacle body 32 by the pressure exerted by nozzle 31. The fuel element assembly is inserted further until nozzle 31 seats in a sealed relation inside valve receptacle 32.

When no fuel element is in place, as in the case of valve means 30, spring loaded flap valve 33*c* remains in the closed position to prevent release of condensate to disturb the equilibrium of pressure between the U tube sections 16*a*, 16*b* or similar condensate trap section of other fuel elements already in place.

Thus, through the use of the apparatus described above, to provide uniform distribution of steam flow and overheating of individual fuel element assemblies by condensate trapped therein is eliminated.

Although the foregoing embodiments have been described in detail, there are obviously many other embodiments and variations in configuration which can be made by a person skilled in the art without departing from the spirit, scope or principle of this invention. Therefore, this invention is not to be limited except in accordance with the scope of the appended claims.

What is claimed is:

1. In a steam superheating nuclear reactor core having at least two fuel element assemblies having a common inlet and a common outlet, each of said fuel element assemblies including therein a partitioned chamber disposed at a common level wherein condensate from said fuel element assembly may collect and at least partially block steam passage therethrough, the improvement comprising manifold means intercommunicating said partitioned chambers of said fuel element assemblies for equalizing the level of condensate trapped therein, thereby providing for equalized volumetric steam flow through said fuel element assemblies.

2. Apparatus as described in claim 1, in which said fuel element assembly comprises a first and second process tube with one elevated end and a lower end and with fissile fuel disposed therein, said elevated end of said first process tube communicating with said common inlet and said elevated end of said second process tube communicating with said common outlet with said partitioned chamber connecting said lower ends of said process tubes.

3. Apparatus as described in claim 1, in which said fuel element assembly comprises a first and second process tube with one elevated end and one lower end with fissile fuel disposed therein, said elevated end of said first process tube communicating with said common inlet and said elevated end of said second process tube communicating with said common outlet and said partitioned chamber comprising conduit means communicating the lower ends of said first and second process tubes wherein condensate may collect and at least partially block steam passage from said first to said second process tube.

4. Apparatus as described in claim 1, in which said manifold means interconnecting said partitioned chambers includes a plurality of elongated nozzle means each associated with one pair of said fuel assemblies and communicating with said partitioned chamber, a plurality of receptacle body means adapted for positioning in a fixed position to receive said nozzle means including closure means operable upon insertion of said nozzle means therein and conduit means intercommunicating said receptacle bodies for equalizing the condensate level trapped in said partitioned chambers.

5. Apparatus as described in claim 1, in which said partitioned chamber comprises a chamber open at two ends and a partition depending into said chamber between said openings at a level below the level of said common inlet and said common outlet.

References Cited
UNITED STATES PATENTS

| | | | |
|---|---|---|---|
| 3,174,907 | 3/1965 | Bradley | 176—20 |
| 3,183,167 | 5/1965 | Bradley | 176—59 |
| 3,183,168 | 5/1965 | Bell | 176—59 |

L. DEWAYNE RUTLEDGE, *Primary Examiner.*